(12) United States Patent

Kim et al.

(10) Patent No.: US 12,691,856 B2

(45) Date of Patent: Jul. 28, 2026

(54) PEDAL SIMULATOR

(71) Applicant: HL MANDO CORPORATION, Gyeonggi-do (KR)

(72) Inventors: Hyundong Kim, Gyeonggi-do (KR); Sooyong Jeon, Gyeonggi-do (KR); Heejun Kim, Gyeonggi-do (KR); Yeonseong Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/751,135

(22) Filed: Jun. 21, 2024

(65) Prior Publication Data

US 2025/0145126 A1 May 8, 2025

(30) Foreign Application Priority Data

Nov. 8, 2023 (KR) ......................... 10-2023-0153717

(51) Int. Cl.
| *B60T 8/40* | (2006.01) |
| *B60T 7/04* | (2006.01) |
| *F15B 15/20* | (2006.01) |

(52) U.S. Cl.
CPC .............. B60T 8/409 (2013.01); B60T 7/042 (2013.01); F15B 15/20 (2013.01)

(58) Field of Classification Search
CPC ................................ B60T 8/4086; B60T 8/409
See application file for complete search history.

(56) References Cited

U.S. PATENT DOCUMENTS

| 2010/0283315 | A1* | 11/2010 | Isono | .................... B60T 8/4086 |
| | | | | 303/9.75 |
| 2019/0061720 | A1* | 2/2019 | Kunz | ..................... B60T 8/409 |
| 2019/0232935 | A1* | 8/2019 | Kim | ..................... B60T 13/686 |
| 2021/0309198 | A1* | 10/2021 | Tarandek | .............. B60T 13/686 |
| 2022/0041149 | A1* | 2/2022 | Tarandek | ................ B60T 7/042 |
| 2022/0219664 | A1* | 7/2022 | Kim | ..................... B60T 13/686 |
| 2022/0242381 | A1* | 8/2022 | Kim | ..................... B60T 13/686 |
| 2022/0371562 | A1* | 11/2022 | Borgemenke | ......... B60T 13/146 |

FOREIGN PATENT DOCUMENTS

| KR | 10-2019-0021365 | 3/2019 | |
| KR | 10-2019-0091987 | 8/2019 | |
| KR | 20220094476 A | * 7/2022 | ............ B60T 13/148 |

* cited by examiner

*Primary Examiner* — Thomas E Lazo

(74) *Attorney, Agent, or Firm* — WOMBLE BOND DICKINSON (US) LLP

(57) ABSTRACT

A pedal simulator is disclosed. The pedal simulator according to an embodiment may include a cylinder of which a side is connected to a reservoir storing a pressing medium and another side is connected to a wheel cylinder, the cylinder including an internal space in which the pressing medium is stored, and a piston of which a portion is movable back and forth by a brake pedal inside the cylinder, the piston configured to provide a reaction force corresponding to a pedal effort of the brake pedal while moving back and forth and discharge the pressing medium stored in the internal space of the cylinder toward the wheel cylinder.

20 Claims, 6 Drawing Sheets

PEDAL SIMULATOR

CROSS-REFERENCE TO RELATED APPLICATION(S)

This application is based on and claims priority under 35 U.S.C. § 119 to Korean Patent Application No. 10-2023-0153717, filed on Nov. 8, 2023, in the Korean Intellectual Property Office, the disclosure of which is incorporated by reference herein in its entirety.

BACKGROUND

1. Field

The disclosure relates to a pedal simulator, and more particularly, to a pedal simulator capable of providing a fail safe function by providing pedal feeling to a driver while generating hydraulic pressure in an electronic brake system.

2. Description of the Related Art

In general, vehicles are essentially equipped with a brake system for braking. Recently, an electronic brake system has been proposed that electronically controls the braking hydraulic pressure transferred to the wheel cylinders mounted on the wheels to obtain a stronger and more stable braking force.

Examples of such an electronic brake system include Anti-Lock Brake System (ABS), Brake Traction Control System (BTCS), or Electronic Stability Control System (ESC), etc.

The electronic brake systems provide pedal feeling to drivers by installing a separate hydraulic pedal feeling simulator (hereinafter, referred to as a 'pedal simulator') in order to provide pedal feeling to the drivers when braking. The pedal simulator is designed and used to provide a reaction force similar to that of the pedal simulator of a Conventional Brake System (CBS) in order to provide pedal feeling that is relatively familiar to the drivers.

Pedal simulators are classified into dry types and wet types depending on the kind of working fluid for generating pedal feeling.

More specifically, the dry type pedal simulator can configure system with a relatively simple structure by a method of generating pedal feeling using air filled in cylinders containing pistons that reciprocate linearly according to the operation of the brake pedal, but the dry type pedal simulator is difficult to implement the fail safe function. In contrast, the wet type pedal simulator has a relatively complicated structure by a method of generating pedal feeling using brake oil filled in cylinders containing pistons that reciprocate linearly according to the operation of the brake pedal, compared to the dry type pedal simulator, but the wet type pedal simulator can implement the passive fail safe function because it can transfer hydraulic pressure to the wheel cylinders.

Meanwhile, recently, it has become important to not only improve the basic performances of the vehicle, such as driving and braking, but also to secure vehicle stability through the application of multiple systems such that various systems constituting the vehicle can operate even when some problems occur in the systems. Accordingly, the need to develop the wet type pedal simulator capable of implementing the fail safe function is also increasing.

SUMMARY

It is an embodiment of the disclosure to provide a pedal simulator capable of providing a driver with pedal feeling that is similar to that of a general hydraulic brake system in an electronic brake system.

It is an embodiment of the disclosure to provide a pedal simulator capable of transferring hydraulic pressure to a wheel cylinder that provides a braking force upon application to various electronic brake systems including an electric caliper brake system and an electro mechanical brake (EMB) system.

It is an embodiment of the disclosure to provide a pedal simulator capable of detecting an accurate displacement of a brake pedal with a relatively simple structure in a wet type pedal simulator in which working fluid for generating pedal feeling is oil.

It is an embodiment of the disclosure to provide a pedal simulator capable of being used as a master cylinder while providing a driver with pedal feeling in an electronic brake system.

Additional aspects of the disclosure will be set forth in part in the description which follows and, in part, will be obvious from the description, or may be learned by practice of the disclosure.

According to an embodiment of the disclosure, there is provided a pedal simulator including a cylinder of which a side is connected to a reservoir storing a pressing medium and another side is connected to a wheel cylinder, the cylinder including an internal space in which the pressing medium is stored, and a piston of which a portion is movable back and forth by a brake pedal inside the cylinder, the piston configured to provide a reaction force corresponding to a pedal effort of the brake pedal while moving back and forth and discharge the pressing medium stored in the internal space of the cylinder toward the wheel cylinder.

The cylinder may include a small diameter portion configured to guide a back-and-forth movement of the piston, and a large diameter portion having a larger diameter than the small diameter portion by a step portion.

The cylinder may further include an inlet port provided in the small diameter portion to be connected to the reservoir, and an outlet port provided in the large diameter portion to be connected to the wheel cylinder.

The cylinder may further include a first sealing member and a second sealing member respectively provided at both sides of the inlet port in an axial direction.

The cylinder may further include a first guide bush and a second guide bush respectively provided at both ends of the small diameter portion.

The cylinder may further include a feeling damper configured to be compressible according to a back-and-forth movement of the piston.

The feeling damper may include a feeling damper housing configured to fix the feeling damper to the cylinder.

The feeling damper housing may include a feeling damper inserting groove which an end of the feeling damper is inserted in and fixed to, and a fixing member coupled to the cylinder.

The piston may include a push rod connected to the brake pedal, a first flange provided at one end to which the push rod is coupled, a second flange provided at another end positioned inside the cylinder, and a feeling damper inserting groove which is provided at the other end positioned inside the cylinder and in which a portion of the feeling damper is inserted.

The piston may further include a return spring provided between the first flange and the cylinder, and a piston damper provided between the second flange and the step portion.

The piston may further include a connection port formed in the feeling damper inserting groove and configured to be connected to or blocked from an inlet port connecting the reservoir to the cylinder according to the back-and-forth movement.

The piston may further include a feeling damper pressing protrusion formed inside the feeling damper inserting groove and configured to press an end of the feeling damper.

According to an embodiment of the disclosure, there is provided a pedal simulator including a reservoir including a pedal travel sensor and storing a pressing medium, a cylinder of which one side is connected to the reservoir and another side is connected to a wheel cylinder, the cylinder including an internal space in which the pressing medium is stored, and a piston including a first magnet or a second magnet provided toward the pedal travel sensor and configured to form a magnetic field, wherein a portion of the piston is movable back and forth by a brake pedal inside the cylinder, the piston configured to provide a reaction force corresponding to a pedal effort of the brake pedal while moving back and forth and discharge the pressing medium stored in the internal space of the cylinder toward the wheel cylinder.

The pedal travel sensor may be configured to detect a displacement of the brake pedal based on a change of a magnetic field formed by the first magnet or the second magnet moving back and forth together with the piston.

The reservoir may further include a switch integrated into or separated from the pedal travel sensor and configured to detect a head differential of the pressing medium stored in the reservoir.

The piston may further include a push rod connected to the brake pedal, a first flange provided at an end to which the push rod is coupled, and a second flange provided at another end positioned inside the cylinder.

The piston may further include a magnet coupling portion which is provided at the first flange and to which the first magnet is coupled.

The first magnet may be in a shape of a ring.

The piston may further include a magnet holder which is provided at the first flange and to which the second magnet is coupled.

The second magnet may be in a shape of a rod.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
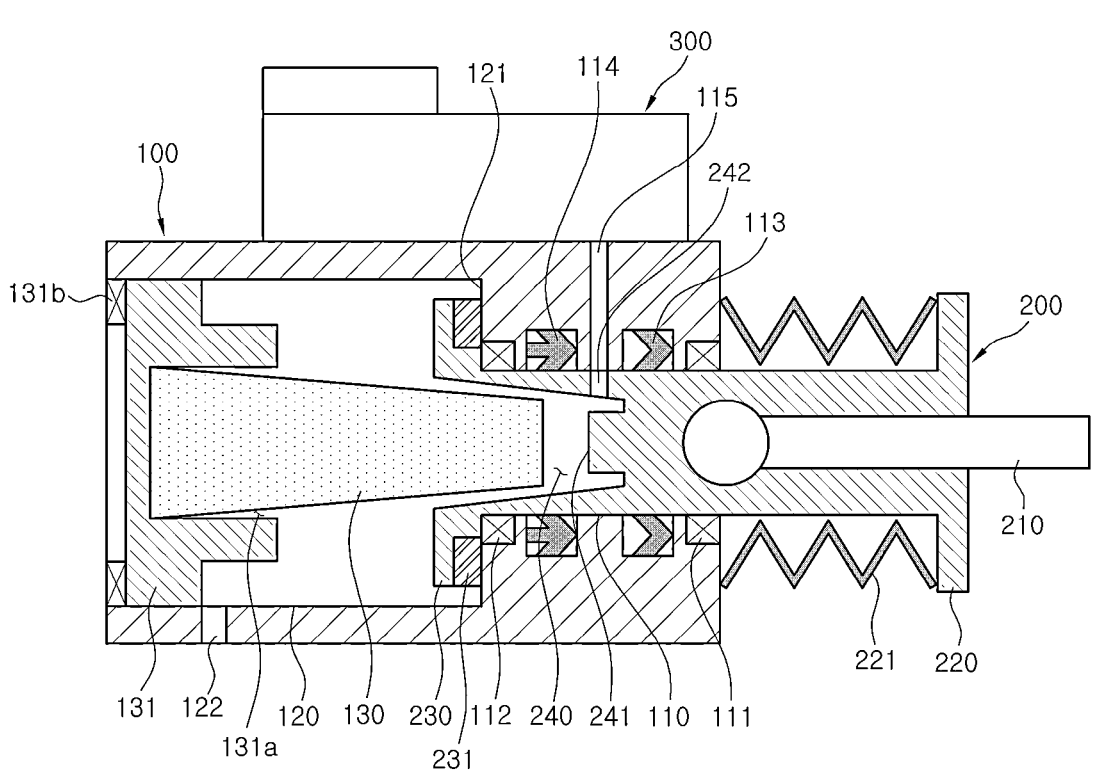
FIG. 1 is a cross-sectional view showing an initial state of a pedal simulator according to an embodiment of the disclosure.

Hereinafter, embodiments of the disclosure will be described in detail with reference to the accompanying drawings. The following embodiments are provided to sufficiently transfer the technical concepts of the disclosure to one of ordinary skill in the technical art to which the disclosure belongs. However, the disclosure is not limited to these embodiments, and may be embodied in another form. In the drawings, parts that are irrelevant to the descriptions may be not shown in order to clarify the disclosure, and also, for easy understanding, the sizes of components are more or less exaggeratedly shown.

Figure 2:
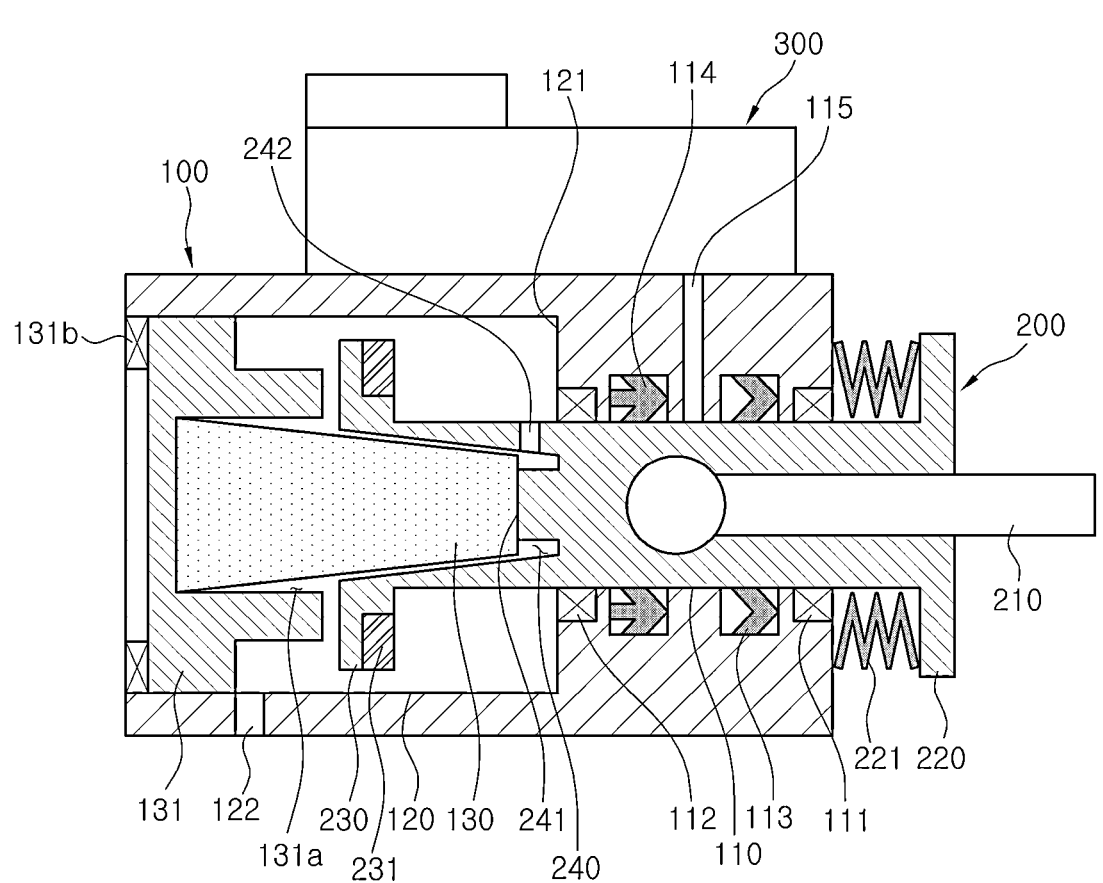
FIG. 2 is a cross-sectional view showing an operation state of a pedal simulator according to an embodiment of the disclosure.

FIGS. 1 and 2 are cross-sectional views respectively showing an initial state and operation state of a pedal simulator according to an embodiment of the disclosure.

Referring to FIGS. 1 and 2, the pedal simulator according to an embodiment of the disclosure may include a cylinder 100 having an internal space to store a pressing medium such as brake oil, a piston 200 provided in a side of the cylinder 100 such that at least a portion of the piston 200 is slidingly movable inside the cylinder 100, and a reservoir 300 in which the pressing medium such as brake oil is stored to supply the pressing medium to the cylinder 100.

The cylinder 100 may have the internal space in which the pressing medium is stored, as described above, and the piston 200 slides, and the cylinder 100 may be in a shape of a hollow cylinder. More specifically, the cylinder 100 may include a small diameter portion 110 provided at an end portion of the cylinder 100 where an opening in which the piston 200 is inserted is formed, a large diameter portion 120 provided at another end portion of the cylinder 100 where an opening in which a feeling damper 130 which will be described below is inserted is formed, and the feeling damper 130 provided inside the large diameter portion 120.

The small diameter portion 110 may be adjacent to an outer circumferential surface of the piston 200 in such a way as to surround the outer circumferential surface of the piston 200, and may include a first guide bush 111 and a second guide bush 112 respectively coupled to both ends. The both ends may be both ends in axial direction of the small diameter portion 110. Also, the small diameter portion 110 may further include a first sealing member 113 provided at the first guide bush 111, a second sealing member 114 provided at the second guide bush 112, and an inlet port 115 provided between the first sealing member 113 and the second sealing member 114.

Each of the first guide bush 111 and the second guide bush 112 may be in a shape of a ring to enable the piston 200 to smoothly slide and move thereon, and may be arranged concentrically with respect to an axial center of the small diameter portion 110. Also, as shown in FIG. 1, the first guide bush 111 may be positioned at the opening in which the piston 200 is inserted, and the second guide bush 112 may be positioned toward the large diameter portion 120.

The first sealing member 113 may be in a shape of a ring, and a cross section of the first sealing member 113 may have various shapes including a "L" shape. The first sealing member 113 may be positioned between the first guide bush 111 and the inlet port 115. To this end, the small diameter portion 110 may further include a coupling groove to which the first sealing member 113 is coupled.

The second sealing member 113 may be in a shape of a ring, and provided as a sealing member that is deformed while the piston 200 slidingly moves from the small diameter portion 110 toward the large diameter portion 120 and is restored while the piston 200 slidingly moves from the large diameter portion 120 toward the small diameter portion 110. The second sealing member 113 may be positioned between the second guide bush 112 and the inlet port 115. To this end, the small diameter portion 110 may further include a coupling groove to which the second sealing member 114 is coupled.

The inlet port 115 may be a passage through which a pressing medium such as brake oil flows in from the reservoir 300, and may be positioned between the first sealing member 113 and the second sealing member 114 to prevent a pressing medium inside the cylinder 100 from flowing into the reservoir 300. Also, the inlet port 115 may open in an initial state of the pedal simulator according to an embodiment of the disclosure, as shown in FIG. 1, and the inlet port 115 may be closed in an operation state of the pedal simulator according to an embodiment of the disclosure, as shown in FIG. 2. That is, the inlet port 115 may be closed according to a sliding movement of the piston 200 from the small diameter portion 110 toward the large diameter portion 120, and open according to a sliding movement of the piston 200 from the large diameter portion 120 toward the small diameter portion 110.

The large diameter portion 120 may extend from the small diameter portion 110 and have a larger diameter than the small diameter portion 110 by a step portion 121. The large diameter portion 120 may include an outlet port 122 through which the pressing medium stored in the cylinder 100 is discharged toward a wheel cylinder (not shown) according to a sliding movement of the piston 200.

The outlet port 122 may be provided outside a sliding movement path of the piston 200 and adjacent to the other end portion of the cylinder 100 where the opening for insertion of the feeling damper 130 is formed. Accordingly, an amount by which the pressing medium stored in the cylinder 100 is discharged through the outlet port 122 may depend on pressure generated by the piston 200 that slidingly moves from the small diameter portion 110 toward the large diameter portion 120. Also, the outlet port 122 may further include a flow path connected to a wheel cylinder positioned in each wheel to provide a braking force, in an electronic brake system to which the pedal simulator according to an embodiment of the disclosure is applied, which is not shown.

The feeling damper 130 may have a cone shape and be made of an elastic material such as rubber so as to be compressed by being contacted by the piston 200 and pressed by the piston 200 to generate braking sensation provided to a driver. The feeling damper 130 may include a feeling damper housing 131 that is fixed to the cylinder 100. More specifically, the feeling damper 130 may be positioned in the large diameter portion 120 by being fixed to a feeling damper fixing groove 131*a* provided by a rib protruding toward the small diameter portion 110 in the feeling damper housing 131. In this case, an end of the feeling damper 130, the end having a large diameter, may be inserted in and fixed to the feeling damper fixing groove 131*a* such that another end having a small diameter is positioned toward the small diameter portion 110. Also, the rib for forming the feeling damper fixing groove 131*a* may be sufficiently spaced apart from the piston 200 even when the piston 200 moves a maximum distance toward the large diameter portion 120. Also, the feeling damper housing 131 may further include a fixing member 131*b* such as a C clip to be stably fixed to the cylinder 100.

The piston 200 may include a push rod 210, a first flange 220, a second flange 230, and a feeling damper inserting groove 240, and be coupled to the cylinder 100 in such a way as to be slidingly movable in an axial direction of the cylinder 100.

An end of the push rod 210 may be directly or indirectly connected to a brake pedal (not shown), and another end of the push rod 210 may be connected to the piston 200. Accordingly, when the driver presses the brake pedal, the piston 200 may slidingly move from the small diameter portion 110 toward the large diameter portion 120 by the push rod 210.

The first flange 220 may include a return spring 221 provided at an end to which the push rod 210 is coupled between both ends of the piston 200, and positioned between the first flange 220 and the cylinder 100. In this case, the return spring 221 may include various means capable of providing an elastic force, such as a coil spring. Accordingly, in the initial state as shown in FIG. 1, the piston 200 may be spaced apart from the cylinder 100 in the axial direction by the return spring 221. Also, when the driver presses the brake pedal, the return spring 221 may be compressed according to a sliding movement of the piston 200 toward the cylinder 100 by the push rod 210, as shown in FIG. 2, to provide pedal feeling to the driver.

The second flange 230 may be provided at another end of the piston 200, positioned toward the large diameter portion 120, between the both ends of the piston 200, to prevent the piston 200 from departing from the cylinder 100 by the return spring 221. Also, the second flange 230 may include a piston damper 231 being in a shape of a ring and positioned toward the step portion 121 to absorb a shock generated when the driver releases the pressure applied to the brake pedal so that the second flange 230 contacts or collides with the step portion 121 by the return spring 221.

The feeling damper inserting groove 240 may be a groove in which a portion of the feeling damper 130 is inserted at a center of the end of the piston 200 at which the second flange 230 is formed. The feeling damper inserting groove 240 may have a cone shape, and at an inner center of the feeling damper inserting groove 240, a feeling damper pressing protrusion 241 may protrude toward the feeling damper 130. Accordingly, when the driver presses the brake pedal, as shown in FIG. 2, the piston 200 may slide and move toward the cylinder 100 by the push rod 210, and an end of the feeling damper 130 may be compressed by the feeling damper pressing protrusion 241 and an inner circumferential surface of the feeling damper inserting groove 240 to provide the driver with pedal feeling together with the return spring 221. Also, the feeling damper inserting groove 240 may further include a connection port 242 which communicates the inlet port 115 with the large diameter portion 120 in the initial state, as shown in FIG. 1, and closes the inlet port 115 by the piston 200 in the operation state, as shown in FIG. 2.

Accordingly, in the pedal simulator according to an embodiment of the disclosure, because the pressing medium such as brake oil stored in the reservoir 300 flows into the internal space of the cylinder 100 through the inlet port 115 and the connection port 242 in the initial state, and in the operation state, the pressing medium is discharged to the outlet port 122 by pressure according to a sliding movement of the piston 200, a passive fail safe function capable of performing braking by a driver's brake pedal control even when some components of the electronic brake system have failed, without adding a separate structure or component, may be provided.

The reservoir 300 may be provided to a side of the cylinder 100 and store the pressing medium such as brake oil to supply the pressing medium to the cylinder 100 or collect the pressing medium stored in the cylinder 100. Also, the reservoir 300 is shown to be coupled to the cylinder 100, however, the reservoir 300 may be spaced apart from the cylinder 100 by a hydraulic circuit, etc. Also, the reservoir 300 may include a separate cap for supplying the pressing medium.

Because the pedal simulator according to an embodiment including the above-described components is used as a master cylinder while providing pedal feeling to a driver in an electronic brake system, the structure of the electronic brake system may be simplified compared to a conventional electronic brake system including both a pedal simulator and a master cylinder.

Also, because the pedal simulator according to an embodiment is capable of transferring hydraulic pressure to the wheel cylinder of providing a braking force upon application to various electronic brake systems including an electric caliper brake system and an Electro Mechanical Brake (EMB) system, the pedal simulator may provide a passive fail safe function capable of performing braking by a driver's brake pedal control even when some components of the electronic brake system have failed, without adding a separate structure or component.

Figure 3:
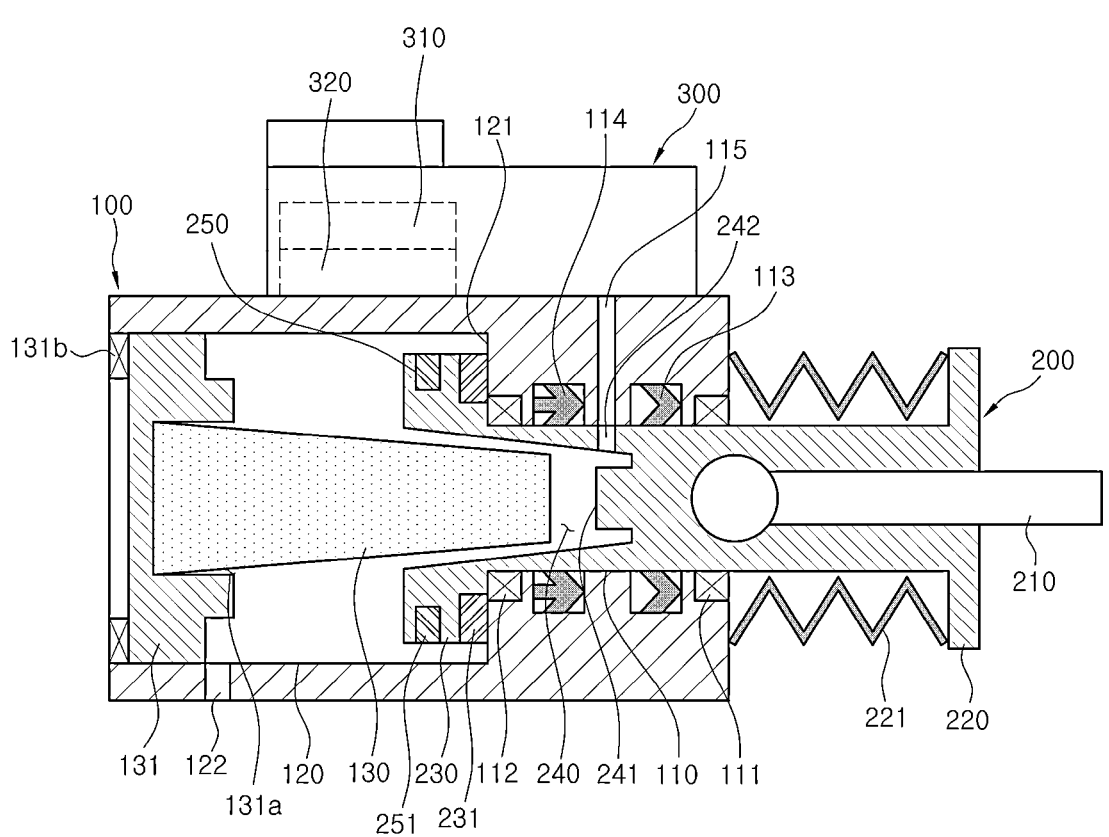
FIG. 3 is a cross-sectional view showing an initial state of a pedal simulator according to another embodiment of the disclosure.
Figure 4:
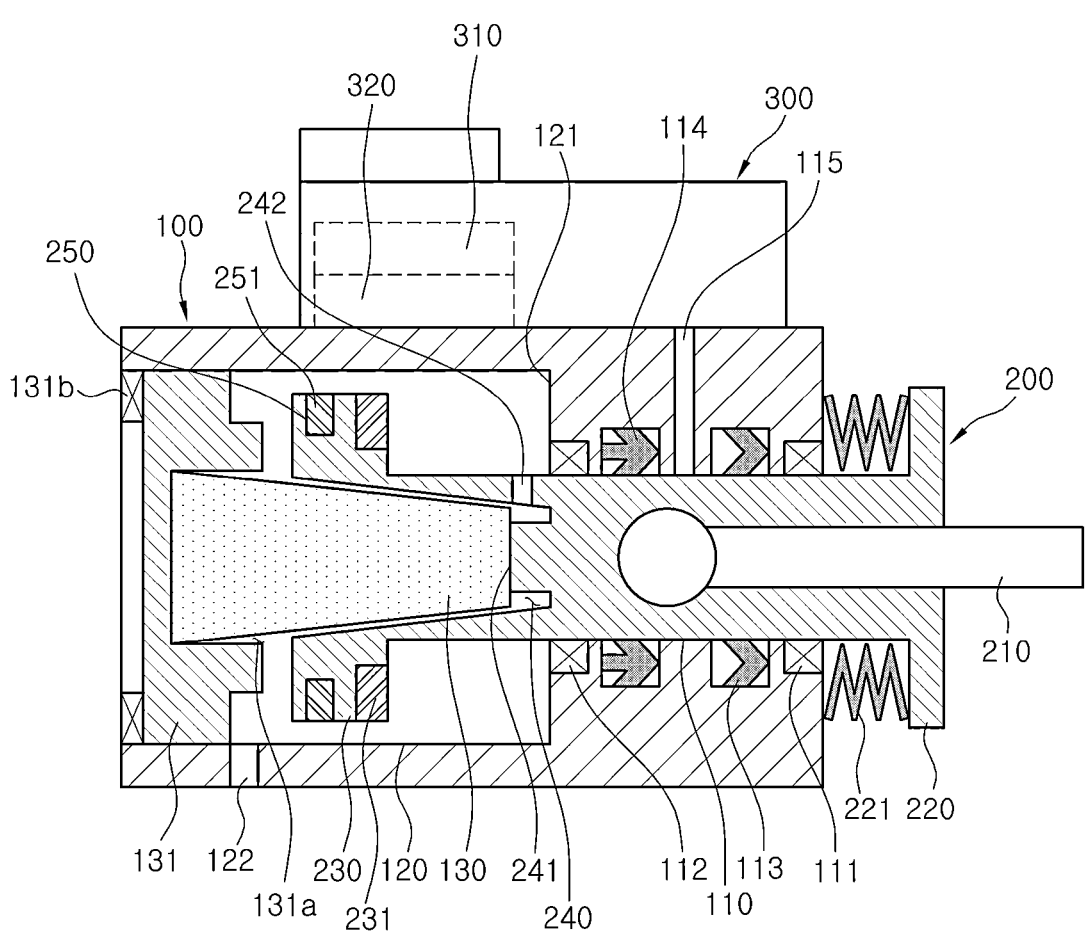
FIG. 4 is a cross-sectional view showing an operation state of a pedal simulator according to another embodiment of the disclosure.
Figure 5:
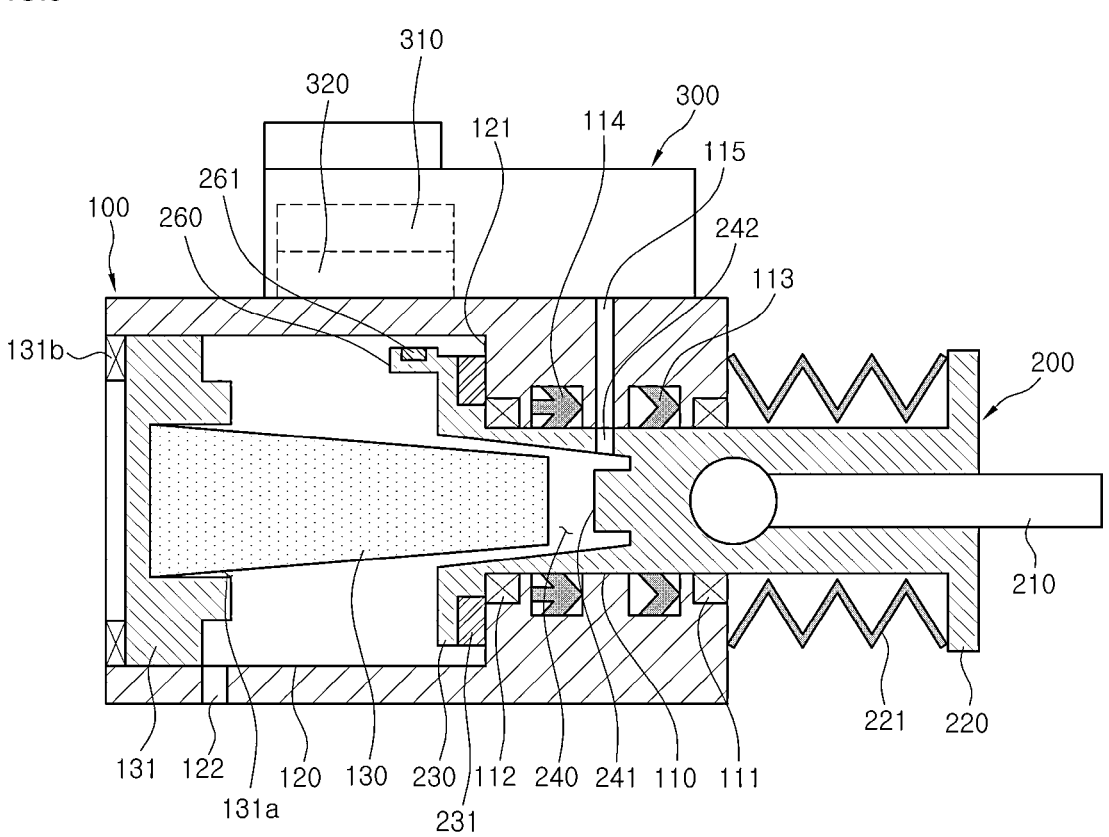
FIG. 5 is a cross-sectional view showing an initial state of a pedal simulator according to another embodiment of the disclosure.
Figure 6:
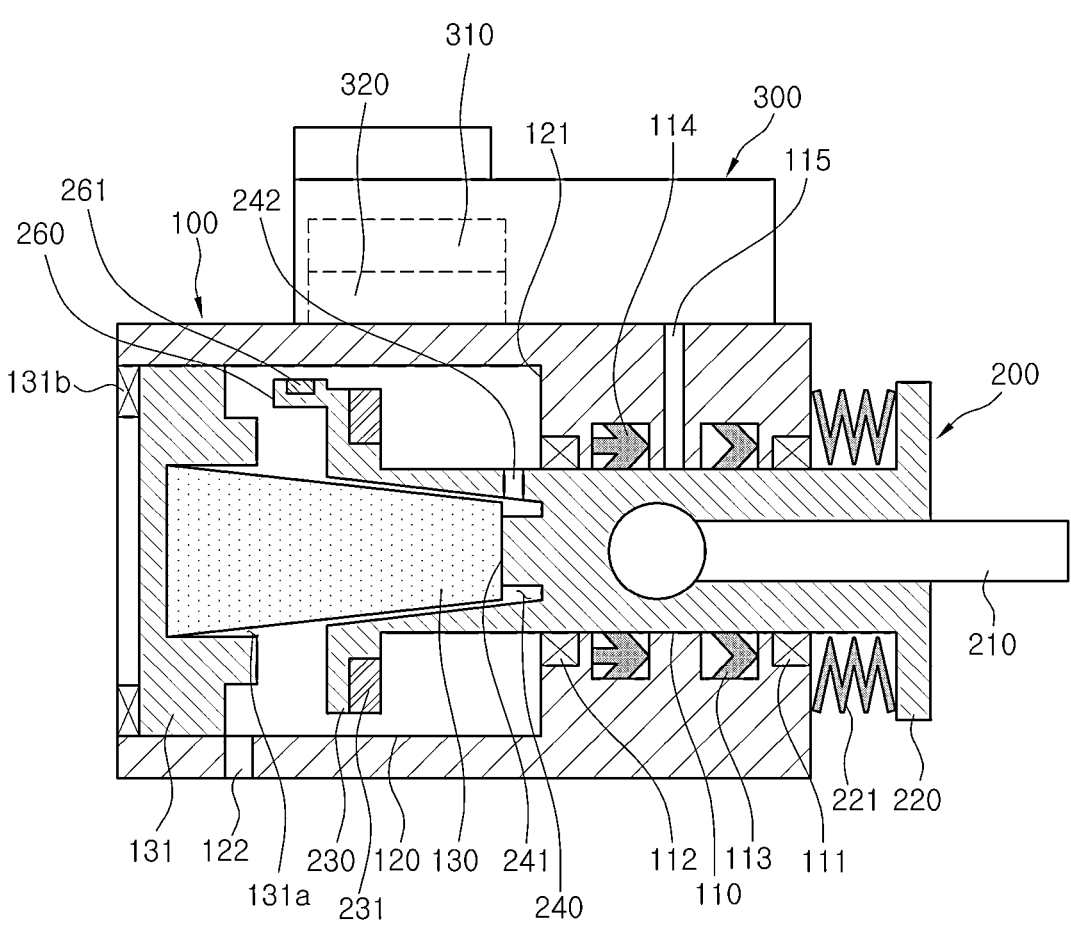
FIG. 6 is a cross-sectional view showing an operation state of a pedal simulator according to another embodiment of the disclosure.

FIGS. 3 and 4 are cross-sectional views respectively showing an initial state and operation state of a pedal simulator according to another embodiment of the disclosure. Also, FIGS. 5 and 6 are cross-sectional views respectively showing an initial state and operation state of a pedal simulator according to another embodiment of the disclosure.

Referring to FIGS. 3 to 6, the pedal simulator according to another embodiment of the disclosure may include all components of the pedal simulator according to the above-described embodiment, and further include an additional component for detecting an accurate displacement of a brake pedal with a relatively simple structure. Also, although the pedal simulator according to another embodiment of the disclosure does not include all the components of the above-described embodiment, the pedal simulator may be applied to various wet type pedal simulators that uses oil as working fluid for generating pedal feeling.

Hereinafter, descriptions about the same components as those of the above-described embodiment will be omitted, and an additional component will be described. The piston 200 may further include a magnet provided at the end portion of the piston 200 positioned in the internal space of the cylinder 100 to form a magnetic field.

Also, the reservoir 300 may include, as shown in FIGS. 3 to 6, a switch 310 and a Pedal Travel Sensor (PTS) 320 that is adjacent to the magnet provided as a first magnet 251 or a second magnet 261. The switch 310 may be means for detecting a head differential of the pressing medium stored in the reservoir 300, and the pedal travel sensor 320 may be means for detecting a displacement of the brake pedal based on a change of a magnetic field formed by the magnet provided as the first magnet 251 or the second magnet 261 according to a sliding movement of the piston 200. In this case, the switch 310 and the pedal travel sensor 320 may be integrated into one body.

More specifically, in the pedal simulator according to another embodiment of the disclosure, the piston 200 may further include, as shown in FIGS. 3 and 4, a magnet coupling portion 250 which is provided at an end portion of the second flange 230 and to which the first magnet 251 having a ring shape and forming a magnetic field is coupled. In an area where the first magnet 251 slides and moves, each of the cylinder 100, the piston 200, and the reservoir 300 may be made of a material that does not influence a magnetic field formed by the first magnet 251. Also, the magnet coupling portion 250 and the first magnet 251 coupled to the magnet coupling portion 250 may be closer to the feeling damper housing 131 compared to the piston damper 231, in order to facilitate an arrangement of the pedal travel sensor 320.

Meanwhile, in the pedal simulator according to another embodiment of the disclosure, the piston 200 may further include, as shown in FIGS. 5 and 6, a magnet holder 260 which is provided at the end of the second flange 230 and to which the second magnet 261 is coupled. In an area the second magnet 261 slides and moves, each of the cylinder 100, the piston 200, and the reservoir 300 may be made of a material that does not influence a magnetic field formed by the second magnet 261. Also, the magnet holder 260 may be closer to the reservoir 300 compared to the second flange 230 and may protrude to prevent a contact to the feeling damper housing 131 in an operation state, thereby further facilitating an arrangement of the pedal travel sensor 320 which will be described below.

Accordingly, the pedal simulator according to an embodiment may detect an accurate displacement of the brake pedal with a relatively simple structure even in a wet type pedal simulator in which working fluid for generating pedal feeling is oil, thereby easily constructing various electronic brake systems.

Also, because the pedal simulator according to an embodiment can detect an accurate displacement of the brake pedal with a relatively simple structure and provide pedal feeling to a driver in an electronic brake system while being used as a master cylinder, as described above, the pedal simulator may simplify the structure of the electronic brake system, and because the pedal simulator can transfer hydraulic pressure to the wheel cylinder that provides a braking force upon application to various electronic brake systems including an electric caliper brake system and an EMB system, the pedal simulator may provide a passive fail safe function capable of performing braking by a driver's brake pedal control even when some components of the electronic brake system have failed, without adding a separate structure or component.

The pedal simulator according to an embodiment may provide a driver with pedal feeling that is similar to that of a general hydraulic brake apparatus in an electronic brake system, thereby providing a familiar and comfortable driving environment to the driver.

Because the pedal simulator according to an embodiment can transfer hydraulic pressure to the wheel cylinder that provides a braking force upon application to various electronic brake systems including an electric caliper brake system and an EMB system, the pedal simulator may provide a passive fail safe function capable of performing braking by a driver's brake pedal control even when some components of the electronic brake system have failed, without adding a separate structure or component.

The pedal simulator according to an embodiment may detect an accurate displacement of a brake pedal with a relatively simple structure even in a wet type pedal simulator in which working fluid for generating pedal feeling is oil, thereby easily constructing various electronic brake systems.

The pedal simulator according to an embodiment may be used as a master cylinder while providing a driver with pedal feeling in an electronic brake system, thereby simplifying the structure of the electronic brake system.

So far, the detailed embodiments of the pedal simulator according to the disclosure have been described, however, various modifications can be made without departing from the scope of the disclosure.

Therefore, the scope of the disclosure should not be limited to the above-described embodiments and should be defined by the following claims and equivalents of the claims.

That is, it should be understood that the embodiments described above are merely for illustrative purposes and not for limitation purposes in all aspects. The scope of the disclosure is defined by the following claims, rather than the detailed description, and it should be interpreted that all changes or modified forms derived from the meanings, scope, and equivalent concepts of the claims are included in the scope of the disclosure.

What is claimed is:

1. A pedal simulator comprising:

a cylinder of which a side is connected to a reservoir storing a pressing medium and another side is connected to a wheel cylinder, the cylinder including an internal space in which the pressing medium is stored; and a piston of which a portion is movable back and forth by a brake pedal inside the cylinder, the piston configured to provide a reaction force corresponding to a pedal effort of the brake pedal while moving back and forth and discharge the pressing medium stored in the internal space of the cylinder toward the wheel cylinder, wherein the piston comprises:

a push rod connected to the brake pedal;

a first flange provided at an end to which the push rod is coupled; and a second flange provided at another end positioned inside the cylinder, wherein the cylinder further comprises a feeling damper configured to be compressible according to a back-and-forth movement of the piston, wherein the feeling damper comprises a feeling damper housing configured to fix the feeling damper to the cylinder, and wherein the feeling damper housing comprises a feeling damper inserting groove which an end of the feeling damper is inserted in and fixed to; and a fixing member coupled to the cylinder.

2. The pedal simulator of claim 1, wherein the cylinder comprises:

a small diameter portion configured to guide a back-and-forth movement of the piston; and a large diameter portion having a larger diameter than the small diameter portion by a step portion.

3. The pedal simulator of claim 2, wherein the cylinder further comprises:

an inlet port provided in the small diameter portion to be connected to the reservoir; and an outlet port provided in the large diameter portion to be connected to the wheel cylinder.

4. The pedal simulator of claim 3, wherein the cylinder further comprises a first sealing member and a second sealing member respectively provided at both sides of the inlet port in an axial direction.

5. The pedal simulator of claim 3, wherein the cylinder further comprises a first guide bush and a second guide bush respectively provided at both ends of the small diameter portion.

6. The pedal simulator of claim 1, wherein the piston further comprises a feeling damper inserting groove which is provided at the other end positioned inside the cylinder and in which a portion of the feeling damper is inserted.

7. The pedal simulator of claim 6, wherein the piston further comprises:

a return spring provided between the first flange and the cylinder; and a piston damper provided between the second flange and the step portion.

8. The pedal simulator of claim 6, wherein the piston further comprises a connection port formed in the feeling damper inserting groove and configured to be connected to or blocked from an inlet port connecting the reservoir to the cylinder according to the back-and-forth movement.

9. The pedal simulator of claim 6, wherein the piston further comprises a feeling damper pressing protrusion formed inside the feeling damper inserting groove and configured to press an end of the feeling damper.

10. A pedal simulator comprising:

a cylinder of which a side is connected to a reservoir storing a pressing medium and another side is connected to a wheel cylinder, the cylinder including an internal space in which the pressing medium is stored; and a piston of which a portion is movable back and forth by a brake pedal inside the cylinder, the piston configured to provide a reaction force corresponding to a pedal effort of the brake pedal while moving back and forth and discharge the pressing medium stored in the internal space of the cylinder toward the wheel cylinder, wherein the piston comprises:

a push rod connected to the brake pedal;

a first flange provided at an end to which the push rod is coupled; and a second flange provided at another end positioned inside the cylinder, wherein the cylinder further comprises a feeling damper configured to be compressible according to a back-and-forth movement of the piston, wherein the piston further comprises a feeling damper inserting groove which is provided at the other end positioned inside the cylinder and in which a portion of the feeling damper is inserted, and wherein the piston further comprises a return spring provided between the first flange and the cylinder; and a piston damper provided between the second flange and the step portion.

11. The pedal simulator of claim 10, wherein the cylinder comprises:

a small diameter portion configured to guide a back-and-forth movement of the piston; and a large diameter portion having a larger diameter than the small diameter portion by a step portion.

12. The pedal simulator of claim 11, wherein the cylinder further comprises:

an inlet port provided in the small diameter portion to be connected to the reservoir; and an outlet port provided in the large diameter portion to be connected to the wheel cylinder.

13. The pedal simulator of claim 10, wherein the feeling damper comprises a feeling damper housing configured to fix the feeling damper to the cylinder.

14. The pedal simulator of claim 10, wherein the piston further comprises a connection port formed in the feeling damper inserting groove and configured to be connected to or blocked from an inlet port connecting the reservoir to the cylinder according to the back-and-forth movement.

15. The pedal simulator of claim 10, wherein the piston further comprises a feeling damper pressing protrusion formed inside the feeling damper inserting groove and configured to press an end of the feeling damper.

16. A pedal simulator comprising:

a cylinder of which a side is connected to a reservoir storing a pressing medium and another side is connected to a wheel cylinder, the cylinder including an internal space in which the pressing medium is stored; and a piston of which a portion is movable back and forth by a brake pedal inside the cylinder, the piston configured to provide a reaction force corresponding to a pedal effort of the brake pedal while moving back and forth and discharge the pressing medium stored in the internal space of the cylinder toward the wheel cylinder, wherein the piston comprises:

a push rod connected to the brake pedal;

a first flange provided at an end to which the push rod is coupled;

a second flange provided at another end positioned inside the cylinder;

a return spring provided between the first flange and the cylinder; and a piston damper provided between the second flange and the step portion.

17. The pedal simulator of claim 16, wherein the cylinder comprises:

a small diameter portion configured to guide a back-and-forth movement of the piston; and a large diameter portion having a larger diameter than the small diameter portion by a step portion.

18. The pedal simulator of claim 17, wherein the cylinder further comprises:

an inlet port provided in the small diameter portion to be connected to the reservoir; and an outlet port provided in the large diameter portion to be connected to the wheel cylinder.

19. The pedal simulator of claim 18, wherein the cylinder further comprises a first sealing member and a second sealing member respectively provided at both sides of the inlet port in an axial direction.

20. The pedal simulator of claim 18, wherein the cylinder further comprises a first guide bush and a second guide bush respectively provided at both ends of the small diameter portion.

\* \* \* \* \*